Patented May 28, 1929.

1,715,085

UNITED STATES PATENT OFFICE.

HARRY E. KAISER AND ROY S. HANCOCK, OF KENVIL, NEW JERSEY, ASSIGNORS TO HERCULES POWDER COMPANY, OF WILMINGTON, DELAWARE, A CORPORATION OF DELAWARE.

HIGH-GRADE WOOD ROSIN.

No Drawing. Original application filed March 6, 1926, Serial No. 92,890. Divided and this application filed August 18, 1926. Serial No. 130,104.

Our invention comprises a high grade wood rosin devoid of certain color bodies which are normally present in wood rosin and which, it is believed, have never been hitherto eliminated therefrom, although their presence, for many purposes for which the use of wood rosin is economically desirable, is objectionable and is often prohibitive of the use of wood rosin. Wood rosin embodying our invention may also be distinguished from unrefined wood rosin, or from any other refined wood rosin, by certain characteristics which it exhibits when used as an ingredient of soap and other products.

The purified high grade wood rosin in accordance with my invention may be differentiated from comparable high grade gum rosin, for example, by the fact that the purified wood rosin will be found to have an optical rotation of from about +1° to about +10° as compared with from about +20° to about +35° for high grade gum rosin and the purified wood rosin will be found to contain from about 0.1% to about 0.5% of gasoline insolubles as compared to from about 2.0% to about 5.0% of gasoline insolubles contained in high grade gum rosin.

Wood rosin embodying our invention is adapted for use in sizing the higher grades of paper and in the manufacture of the better grades of varnish, and indeed is so thoroughly purified and refined that it is adapted for use in the manufacture of high grade rosin soaps and limed varnishes of satisfactory color, as well as for most, if not all, other purposes for which gum rosin is adapted.

In order that those skilled in the art may produce wood rosin having the qualities and characteristics distinguishing our invention from other wood rosin, whether crude or partly purified and refined, we shall describe in detail the process that we have successfully used for its production.

A known process of producing wood rosin of a lower grade, and the process that we preferably, but not necessarily, employ as a preliminary process in the manufacture of our more highly refined rosin, consists in grinding wood and stumps from pine trees, placing the wood stock in large digesters, passing steam through the stock and thus driving off a considerable quantity of turpentine, flooding the stock with gasoline or other solvent, thereby extracting certain materials, chiefly rosin, pine oil and various color bodies, passing the gasoline solution, commonly known as "drop liquor", through suitable evaporators, and fractionally removing the gasoline and pine oil. The pine oil produced by the distillation is refined and sold. The recovered gasoline is again used in the process.

The recovered rosin is a marketable product, but is not satisfactory for sizing the highest grades of paper or in making the higher grades of varnish, and therefore must be marketed at a relatively low price.

By means of a preliminary distillation, some of the objectionable coloring matter may be removed. By distilling under a high vacuum at a temperature of from 475°–650° F., preferably 550°–600° F., and fractionally condensing at temperatures of about 400° F., 350° F. and 300° F., three grades of rosin are recoverable, the highest grade being adapted for use in the manufacture of varnish and the higher grades of paper. The proportion of high grade rosin that is recoverable by this process, however, is substantially less than is recoverable by our process, and such rosin is not of a sufficiently high grade to be adapted for use in the manufacture of high grade rosin soaps and limed varnishes of satisfactory color; nor does such rosin have certain characteristics peculiar to the high grade rosin produced by our process, which characteristics will be hereinafter fully set forth.

In the practice of our process, the rosin may be first subjected to any desired distillation process, but such preliminary distillation is unnecessary, and it is preferred to omit it.

Our process comprises the formation of a solution of gasoline, rosin and furfural ($C_5H_4O_2$), its cooling or refrigeration with resultant separation of furfural and coloring bodies, and the recovery of high grade rosin from the remaining solution. The process may be carried out in a single operation, or in two or more operations. It is convenient and economical to divide the process into two operations, and it will be so described as a preferred way of practicing the process. Our process also contemplates, as a minor step, the conversion of the larger part of such minor part of the rosin as is not converted into high grade rosin, and which is of low grade, into medium grade rosin, but such medium grade rosin does not have the peculiar characteristics of the high grade rosin hereinafter claimed. Our process also contemplates the recovery and re-use of the furfural as well as the gasoline.

15 pounds of rosin are added to (say) 85 pounds of gasoline. With this composition is thoroughly mixed (say) 11 pounds of technical furfural. We start, therefore, with the following composition (A):

| | Pounds. |
|---|---|
| Gasoline | 85 |
| Rosin | 15 |
| Furfural | 11 |

The mixture should be heated, preferably to about 115° F. At this temperature a homogeneous solution is formed. The solution is then cooled to a moderate atmospheric temperature (say 60° F.), at which temperature more or less of the furfural is thrown out of solution. A rough or preliminary gravity separation can now be made. The undissolved furfural settles to the bottom, carrying with it most of the color bodies. About twenty per cent of the rosin and a little gasoline is also carried down. The upper layer is a homogeneous solution of gasoline, rosin and furfural. Typical compositions of the two layers would be as follows (ignoring the small proportion of gasoline that is carried down by the furfural, and bearing in mind that the amounts of rosin and furfural in each layer are only approximate):

*Upper layer (B).*

| | Pounds. |
|---|---|
| Gasoline | 85 |
| Rosin | 12 |
| Furfural | 4.25 |

*Lower layer (C).*

| | Pounds. |
|---|---|
| Dark rosin | 3 |
| Furfural | 6.75 |

To the solution (B) resulting from the first treatment is now added more furfural, say 11 pounds, giving the following composition (D):

| | Pounds. |
|---|---|
| Gasoline | 85 |
| Rosin | 12 |
| Furfural | 15.25 |

To this mixture heat need not be applied, but it should be agitated to obtain a thorough washing, and is then cooled down to about 10° F. in order to secure as complete a separation as possible; the solubility of furfural in gasoline decreasing with decrease of temperature. The mixture is then allowed to settle. The undissolved furfural, which is by far the largest proportion of the furfural, settles to the bottom, with some of the rosin and the remaining coloring bodies. The upper layer is a homogeneous solution of gasoline and rosin, with a little furfural. Typical (approximate) compositions of the two layers are:

*Upper layer (E).*

| | Pounds. |
|---|---|
| Gasoline | 85 |
| Purified rosin | 10.5 |
| Furfural | 2.125 |

*Lower layer (F).*

| | Pounds. |
|---|---|
| Dark rosin | 1.5 |
| Furfural | 13.125 |

From composition (E) the gasoline and then the furfural are distilled off, leaving a purified, highest grade rosin having the characteristics, hereinafter described, that distinguished the same from all other heretofore known wood rosins. The recovered gasoline and furfural is then re-used in the process.

Compositions (C) and (F), being the precipitates of the two described treatments, are then (preferably) mixed, giving the following (approximate) composition (G):

| | Pounds. |
|---|---|
| Dark rosin | 4.5 |
| Furfural | 19.875 |

The furfural is distilled off, leaving a dark or low grade rosin. The furfural is re-used in the process.

This low grade rosin may be dissolved in (say) 28 pounds of gasoline and the gasoline-soluble rosin extracted. The insoluble residue is a very dark, brittle substance, being about 5% of the original rosin (say .75 pounds). From the gasoline-rosin solution, the gasoline is distilled off, leaving about 3.75 pounds of a medium grade rosin, being about 25% of the original rosin. The recovered gasoline is re-used in the process.

While the above figures show a recovery of 70% of the original rosin as high grade rosin, the percentage of recovery by the practice of the process ranges from 70% to 75%.

While we have illustrated one way of carrying out the process involving two treatments, in the first of which the mixture of gasoline, rosin and furfural is heated to a relatively high temperature and then cooled to a medium temperature, followed by a gravity separation, and in the second of which the lighter product of the separation is refrigerated, followed by a gravity separation, it should be understood that the process is capable of being carried out, although with less economy of heat, by a single refrigerating treatment, preferably preceded by heating to insure a good homogeneous solution, and followed by a gravity separation. It is also feasible, and may be in some cases advantageous, to increase the number of stages in the treatment. That is, there may be a succession of more or less rough separations of the character described, followed by a final separation.

Less advantageously and less economically, it is possible to dissolve rosin in gasoline and then wash the solution with furfural, no attempt being made to secure a homogeneous solution. Our process, therefore, in its broadest aspect, comprises the removal of color bodies from rosin by dissolving the rosin in gasoline or an equivalent solvent and removing color bodies therefrom by means of furfural.

It should also be understood that it is not intended to limit the separation step or steps to gravity separation. Other modes of separation, such as centrifugal force, may be substituted.

While we have specified gasoline as the solvent for the rosin and furfural, it is intended, by specifying that substance, to include operative equivalents, such as other mineral oil distillates that have not too high a vaporizing temperature. We have even used the lighter lubricating distillates. A heavy hydrocarbon product, however, is undesirable, or even impracticable, because of its decomposing action on the rosin in the step of distilling off the hydrocarbons.

The advantage of furfural is that it is capable of entering into solution with the gasoline and of dissolving or absorbing the coloring bodies of the rosin, and yet can be largely precipitated from the gasoline and most of the rosin without giving up such coloring bodies.

The temperatures specified are largely a matter of choice, although it is desirable that the rosin-containing mixture shall be heated at the beginning to a temperature sufficiently high to form a substantially homogeneous solution, say in excess of 100° F. and that the refrigerating temperature at the end shall be below 25° F. Temperatures as high as 115° F. and as low as 10° F., as specified, are believed to be necessary to secure the best possible solution to start with and a maximum recovery of the highest grade rosin, although less nearly perfect results, with respect to quality and quantity, may be secured by departures from the above temperatures.

The relative proportion of the constituents specified in the several successive compositions are illustrative merely, and are susceptible of considerable variation.

The high grade rosin resulting from the above preferred process, or from the described modifications of the process, and which embodies our invention, has certain definite characteristics by which it is distinguishable from hitherto known wood rosins, including those which are partly purified. All such hitherto known wood rosins contain color bodies, the precise nature of which is not known, but which have certain known objectionable effects when used in the manufacture of certain substances, such as rosin soaps. If, for example, the ordinary commercial wood rosin is used in the manufacture of soap, a finished cake of freshly made soap presents a dark brown exterior and an olive green interior. In the course of time, usually within a few weeks, the dark brown color gradually spreads from the surface toward the center of the cake, as may be seen by taking a cross-section through the soap. In other words, the color is not uniform or homogeneous, or if it becomes so after lapse of sufficient time, the color throughout will become a dark brown. This dark brown color, whether characterizing only the surface or penetrating a greater or lesser distance interiorly, is highly objectionable and unacceptable except where only a low grade soap is desired.

The most highly purified wood rosins hitherto known are also not adapted to the manufacture of high grade soap. The initial color of the soap may be fairly satisfactory, but the surface speedily darkens, and this dark color gradually permeates the soap and spreads toward the center, and a cross-section through the soap exhibits the differential coloring above described.

Undoubtedly, the objections to hitherto known wood rosin soaps arise from the fact that the rosin used in their manufacture contains color bodies which react, in the presence of air, with the alkali in the soap, to form compounds that effect the pronounced and progressive darkening described.

When, however, the purified rosin embodying our invention is utilized in the manufacture of soap, it produces soap having a light buff color. This color may vary somewhat in the degree of lightness, dependent on the particular way in which our process for the purification of the wood rosin is practiced, on the other ingredients of the soap, and on the method of manufacturing the soap; but whatever color the soap may be, its color is the same throughout its mass; and if there should be any degree of darkening with lapse of time, the change in color does not develop or progress from the surface inwardly, but proceeds uniformly throughout the mass, so that a cross-section through the soap exhibits at all times a uniform appearance with regard to color. A wood rosin embodying our invention is, therefore, one devoid of those color bodies which, when the rosin is present in a substance containing an alkali, react, in the presence of air, with such alkali to produce compounds that progressively darken the substance. A wood rosin embodying our invention may be also accurately defined as one which, when employed as an ingredient of soap, produces soap which, when freshly made, or at any given time thereafter, exhibits a substantially uniform or homogeneous color throughout its mass, whether or not there may be any modification of the uniform color with lapse of time.

In the case of soap made with high grade gum rosin, a narrow band of darker color forms just under the surface. This dark band never extends to the surface of the soap. This slight band of darker color will also form in soap made with wood rosin refined by the present process. It does not appear, however, until after the soap is aged for a considerable period, say from ten to twelve months. This darkening, it is believed, is caused, in soap made with wood rosin refined by the present process as well as in soap made with gum rosin, by the gradual drying of the soap, rather than by any color bodies originally present in the rosin.

This application is a division of an application filed by us March 6, 1926, Serial No. 92,890, for a process of producing high grade wood rosin, which in turn is in part a continuation of an application filed by us June 5, 1925, Serial No. 35,245, for a process of recovering high grade wood rosin.

Having now fully described our invention, what we claim and desire to protect by Letters Patent is:

1. A purified high grade wood rosin substantially devoid of those latent color bodies which tend to darken in the presence of air and an alkali and which are removable from wood rosin by the treatment thereof with furfural.

2. A purified high grade wood rosin having an optical rotation of from about +1° to about +10° and substantially devoid of those latent color bodies which tend to darken in the presence of air and an alkali and which are removable from wood rosin by the treatment thereof with furfural.

In testimony of which invention, I, HARRY E. KAISER have hereunto set my hand at Cologne, Germany, on this 2nd day of August, 1926, and I, ROY S. HANCOCK, have hereunto set my hand at Kenvil, New Jersey, on this 17th day of July, 1926.

HARRY E. KAISER.
ROY S. HANCOCK.